United States Patent
Taura

(10) Patent No.: US 8,054,354 B2
(45) Date of Patent: Nov. 8, 2011

(54) SOLID STATE IMAGING DEVICE HAVING BUILT IN SIGNAL TRANSFER TEST CIRCUITRY

(75) Inventor: Tadayuki Taura, Kanagawa (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 12/080,851

(22) Filed: Apr. 7, 2008

(65) Prior Publication Data
US 2008/0259164 A1    Oct. 23, 2008

(30) Foreign Application Priority Data

Apr. 18, 2007   (JP) ............... P2007-109665

(51) Int. Cl.
*H04N 3/14* (2006.01)
*H04N 5/335* (2006.01)
*H04N 17/00* (2006.01)
*H04N 17/02* (2006.01)
(52) U.S. Cl. .................. 348/294; 348/187; 348/302
(58) Field of Classification Search .................. None
See application file for complete search history.

(56) References Cited

U.S. PATENT DOCUMENTS

| | | | | |
|---|---|---|---|---|
| 7,075,474 B2* | 7/2006 | Yamagata et al. | ............ | 341/169 |
| 7,129,883 B2* | 10/2006 | Muramatsu et al. | ......... | 341/164 |
| 7,145,494 B2* | 12/2006 | Mizuguchi et al. | ........... | 341/155 |
| 7,233,277 B2* | 6/2007 | Roh | .............................. | 341/169 |
| 7,522,199 B2* | 4/2009 | Funakoshi et al. | ............ | 348/245 |
| 7,570,293 B2* | 8/2009 | Nakamura | .................... | 348/308 |
| 7,659,925 B2* | 2/2010 | Krymski | .................... | 348/222.1 |

OTHER PUBLICATIONS

W. Yang et al., "An Integrated 800x600 CMOS Image Sistem", ISSCC Digest of Technical Papers, pp. 304-305, Feb. 1999.

* cited by examiner

*Primary Examiner* — Justin P Misleh
(74) *Attorney, Agent, or Firm* — Robert J. Depke; Rockey, Depke & Lyons, LLC

(57) ABSTRACT

A data transfer circuit includes at least one data transfer line that transfers digital data, at least one data detecting circuit connected to the transfer line, holding circuits that hold digital values corresponding to input levels and that transfer the digital values to the transfer line, a scanning circuit that selects a holding circuit from among the holding circuits, at least one test-pattern generating circuit that generates a predetermined digital value, the test-pattern generating circuit being connected to the transfer line, at least one test-column scanning circuit that selects the test-pattern generating circuit, and a start-pulse selecting circuit that controls starting of the scanning circuit and starting of the test-column scanning circuit. The start-pulse selecting circuit has a function of transferring the predetermined digital value to the data transfer line by activating the test-pattern generating circuit via the test-column scanning circuit.

14 Claims, 13 Drawing Sheets

SOLID STATE IMAGING DEVICE HAVING BUILT IN SIGNAL TRANSFER TEST CIRCUITRY

CROSS REFERENCES TO RELATED APPLICATIONS

The present invention contains subject matter related to Japanese Patent Application JP 2007-109665 filed in the Japanese Patent Office on Apr. 18, 2007, the entire contents of which are incorporated herein by reference.

BACKGROUND OF THE INVENTION

1. Field of the Invention

The present invention relates to a data transfer circuit, a solid-state imaging device typified by a complementary metal oxide semiconductor (CMOS) image sensor, and a camera system, and in particular, to a solid-state imaging device including a column analog-to-digital converter, and a camera system.

2. Description of the Related Art

A CMOS image sensor including a column-parallel analog-to-digital converter (ADC) has been proposed (see, for example, W. Yang, et Al., "An Integrated 800×600 CMOS Image System", ISSCC Digest of Technical Papers, pp. 304-305, February, 1999).

FIG. 1 is a block diagram showing an example of the configuration of a solid-state imaging device 1 (CMOS image sensor) including a column-parallel ADC.

The solid-state imaging device 1 includes a pixel array section 2 serving as an image pickup section, a row scanning circuit 3, a column scanning circuit 4, a timing control circuit 5, an ADC group 6, a digital-to-analog converter (DAC) 7, a counter 8, and a subtracting circuit 9.

The pixel array section 2 is formed by unit pixels 21 arranged in a matrix, each unit pixel including a photodiode and an in-pixel amplifier.

In the solid-state imaging device 1, the timing control circuit 5, the row scanning circuit 3, and the column scanning circuit 4 are used as control circuits for sequentially reading signals from the pixel array section 2. The timing control circuit 5 generates internal clocks. The row scanning circuit 3 controls row addresses and row scanning. The column scanning circuit 4 controls column addresses and column scanning.

The ADC group 6 is formed by a plurality of ADCs arranged. The ADCs include comparators 61 and memory devices 62. The comparators 61 compare a ramp waveform RAMP formed by changing, in steps, a reference voltage generated by the DAC 7, and analog signals obtained from the unit pixels 21 for each of row lines H0, H1, . . . via column lines V0, V1, . . . , and the memory devices 21 store count results of the counter 8, which counts comparison times.

Each ADC of the ADC group 6 has an n-bit digital signal conversion function and is disposed for each of the column lines V0, V1, . . . to form a column-parallel ADC block 63.

Outputs of the memory devices 62 are connected to horizontal transfer lines 64 having a 2n-bit width.

In addition, 2n sense circuits corresponding to the horizontal transfer lines 64, the subtracting circuit 9, and an output circuit are disposed.

Here, an operation of the solid-state imaging device 1 (CMOS image sensor) is described, with the operation associated with the timing chart shown in FIG. 2 and the block diagram shown in FIG. 1.

After first-time reading from the unit pixels 21 in any row Hx to the column lines V0, V1, . . . becomes stable, a step-like ramp waveform RAMP in which a reference voltage is time-changed is input from the DAC 7 to one comparator 61, and the comparator 61 compares the input waveform with a voltage in any column line Vx.

In parallel to input of the step-like ramp waveform RAMP, the counter 8 performs the first counting.

Here, when the ramp waveform RAMP is equal to the voltage in any column line Vx in voltage, the output of the comparator 61 is inverted, and, at the same time, a count in accordance with a comparison period is stored in a corresponding memory device 21. In the first-time reading, reset components ΔV in the unit pixels 21 are read. The reset components ΔV include, as offsets, noise varying for each unit pixel 21.

However, in general, a variation in the reset components ΔV is small, and a reset level is common to all the pixels. Thus, an output from any column line Vx is approximately known.

Therefore, at the time of the first-time reading of reset components ΔV, by adjusting the ramp waveform (RAMP) voltage, the comparison period can be reduced. In this example, in a count period (128 clocks) for seven bits, ΔV comparison is performed.

At the time of the second-time reading, in addition to the reset components ΔV, signal components in accordance with the amount of light incident in each unit pixel 21 are read and an operation similar to that performed in the first-time reading is performed.

In other words, after second-time reading from the unit pixels in any row Hx to the column lines V0, V1, . . . becomes stable, the step-like ramp waveform RAMP in which a reference voltage is time-changed is input from the DAC 7 to the comparator 61, and the comparator 61 compares the input waveform with a voltage in any column line Vx.

In parallel to input of the step-like ramp waveform RAMP, the counter 8 performs the second counting.

Here, when the ramp waveform RAMP is equal to the voltage in any column line Vx in voltage, the output of the comparator 61 is inverted, and, at the same time, a count in accordance with the comparison period is stored in the corresponding memory device 62.

At this time, the first and second counts are stored at different locations in the memory device 62.

After the AD conversion period finishes, n-bit digital signals (in the first-time and second-time reading) stored in the memory device 62 by the column scanning circuit 4 pass through the 2n horizontal transfer lines 64. The sense circuits and the subtracting circuit 9 perform processing so that (the signal in the second time)—(the signal in the second time), and output the processed result to the exterior. After that, a similar operation is sequentially repeated for each row, whereby a two-dimensional image is generated.

SUMMARY OF THE INVENTION

However, in the above-described solid-state imaging device 1 (CMOS image sensor), a digital value stored in the memory device 62 depends on an input level and changes at any time.

In addition, the horizontal transfer lines 64 are very long and have, for example, a length of approximately 7 mm. They depend on a parasitic capacitance, a parasitic resistance, or the like. They have a variation in sensing time between a side close to the sense circuit and a side distant from the sense circuit.

However, in a case in which a digital value that is not a default value is read by the sense circuits through the horizontal transfer lines 64, there is a disadvantage in that it is difficult to determine whether the digital value is accurately read.

It is desirable to provide a data transfer circuit, a solid-state imaging device, and a camera system that test a transfer line to a data detecting circuit for a transfer error and that detect defects in the transfer line and the data detecting circuit.

According to an embodiment of the present invention, there is provided a data transfer circuit including at least one data transfer line that transfers digital data, at least one data detecting circuit connected to the at least one data transfer line, a plurality of holding circuits that hold digital values corresponding to input levels and that transfer the digital values to the at least one data transfer line, a scanning circuit that selects a holding circuit from among the plurality of holding circuits, at least one test-pattern generating circuit that generates a predetermined digital value, the at least one test-pattern generating circuit being connected to the at least one data transfer line, at least one test-column scanning circuit that selects the at least one test-pattern generating circuit, and a start-pulse selecting circuit that controls starting of the scanning circuit and starting of the at least one test-column scanning circuit. The start-pulse selecting circuit has a function of transferring the predetermined digital value to the at least one data transfer line by activating the at least one test-pattern generating circuit via the at least one test-column scanning circuit.

According to another embodiment of the present invention, there is provided a solid-state imaging device including an image pickup section in which a plurality of pixels for performing photoelectric conversion are arranged in a matrix, at least one data transfer line that transfers digital data, at least one data detecting circuit connected to the at least one data transfer line, a plurality of holding circuits that hold digital values corresponding to analog input levels read through column lines of the image pickup section and that transfer the digital values to the at least one data transfer line, a scanning circuit that selects a holding circuit among the plurality of holding circuits, at least one test-pattern generating circuit that generates a predetermined digital value, the at least one test-pattern generating circuit being connected to the at least one data transfer line, at least one test-column scanning circuit that selects the at least one test-pattern generating circuit, and a start-pulse selecting circuit that controls starting of the scanning circuit and starting of the at least one test-column scanning circuit. The start-pulse selecting circuit has a function of transferring the predetermined digital value to the at least one data transfer line by activating the at least one test-pattern generating circuit via the at least one test-column scanning circuit.

The at least one test-pattern generating circuit may be disposed at at least one end of a region in which the plurality of holding circuits are arranged.

The at least one test-pattern circuit may include a plurality of test-pattern generating circuits, and the test-pattern generating circuits may be disposed at two ends of a region in which the plurality of holding circuits are arranged.

The plurality of holding circuits may be arranged in parallel, and the at least one data transfer line may be provided in a direction in which the plurality of holding circuits are arranged in parallel and is connected to the at least one data detecting circuit, which is disposed in the direction.

The plurality of holding circuits may be disposed in parallel, and the at least one data transfer line may be provided in a perpendicular direction with respect to a direction in which the plurality of holding circuits are arranged in parallel, and is connected to the at least one data detecting circuit, which is disposed in the perpendicular direction.

The test-pattern generating circuits may include the at least one test-pattern generating circuit, which is disposed in the region in which the plurality of holding circuits are arranged.

According to another embodiment of the present invention, there is provided a camera system including a solid-state imaging device, an optical system that focuses a subject image on the solid-state imaging device, and a signal processing circuit that processes an image signal output from the solid-state imaging device. The solid-state imaging device includes an image pickup section in which a plurality of pixels for performing photoelectric conversion are arranged in a matrix, at least one data transfer line that transfers digital data, at least one data detecting circuit connected to the at least one data transfer line, a plurality of holding circuits that hold digital values corresponding to analog input levels read through column lines of the image pickup section and that transfer the digital values to the at least one data transfer line, a scanning circuit that selects a holding circuit among the plurality of holding circuits, at least one test-pattern generating circuit that generates a predetermined digital value, the at least one test-pattern generating circuit being connected to the at least one data transfer line, at least one test-column scanning circuit that selects the at least one test-pattern generating circuit, and a start-pulse selecting circuit that controls starting of the scanning circuit and starting of the at least one test-column scanning circuit. The start-pulse selecting circuit has a function of transferring the predetermined digital value to the at least one data transfer line by activating the at least one test-pattern generating circuit via the at least one test-column scanning circuit.

According to the embodiments of the present invention, a test-pattern generating circuit for outputting predetermined patterns is added on a transfer line for transferring a digital value. The transfer line for a data detecting circuit is tested for a transfer error.

According to the embodiments of the present invention, a transfer circuit for a data detecting circuit can be tested for a transfer error.

Therefore, defects in the transfer line and the data detecting circuit can be detected.

DESCRIPTION OF THE PREFERRED EMBODIMENTS

An embodiment of the present invention will be described below, with the embodiment associated with the accompanying drawings.

Figure 1:
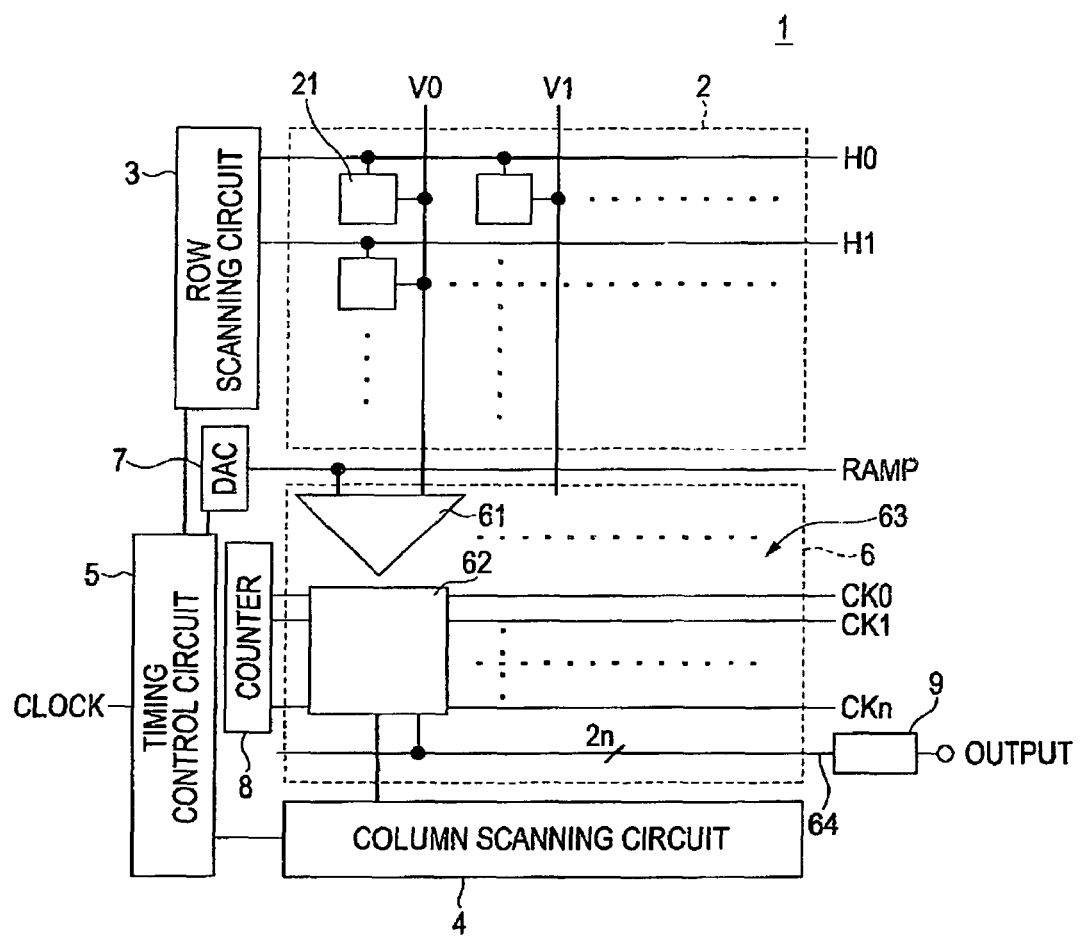
FIG. 1 is a block diagram showing an example of the configuration of a solid-state imaging device (CMOS image sensor) including a column-parallel ADC.
Figure 2:
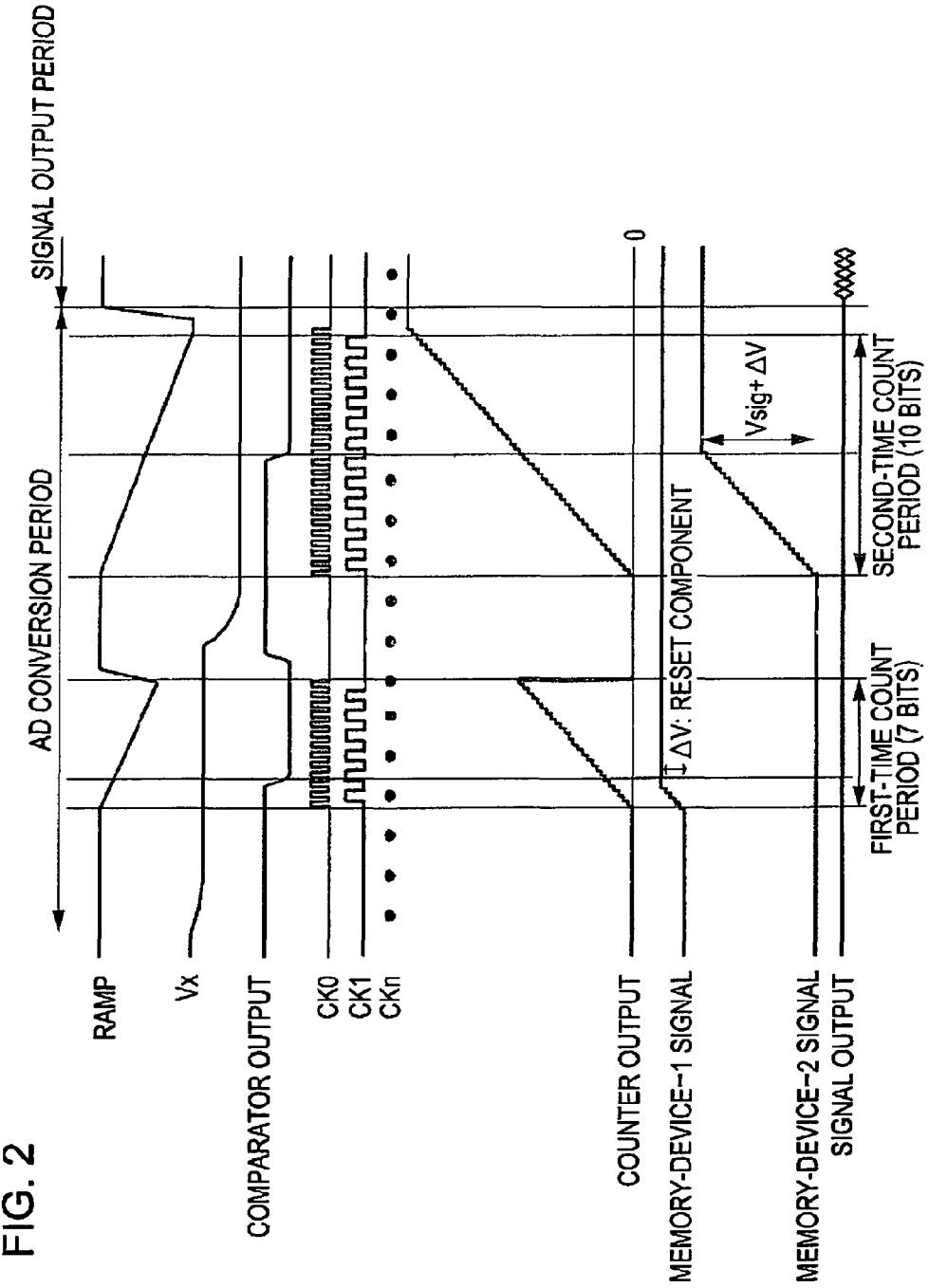
FIG. 2 is a timing chart illustrating an operation of the solid-state imaging device shown in FIG. 1.
Figure 3:
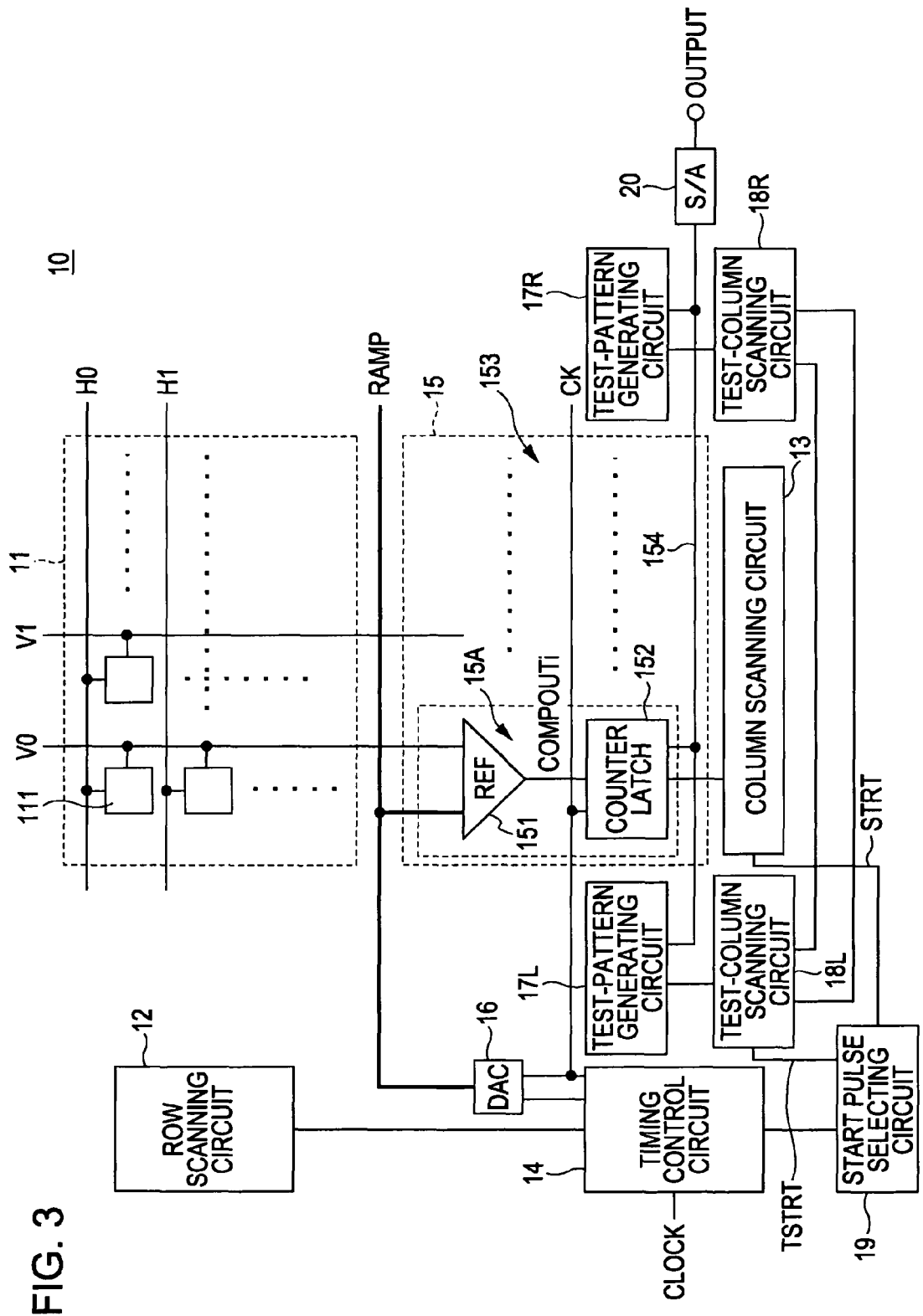
FIG. 3 is a block diagram showing an example of the configuration of a solid-state imaging device (CMOS image sensor), including a column-parallel ADC, according to an embodiment of the present invention.
Figure 4:
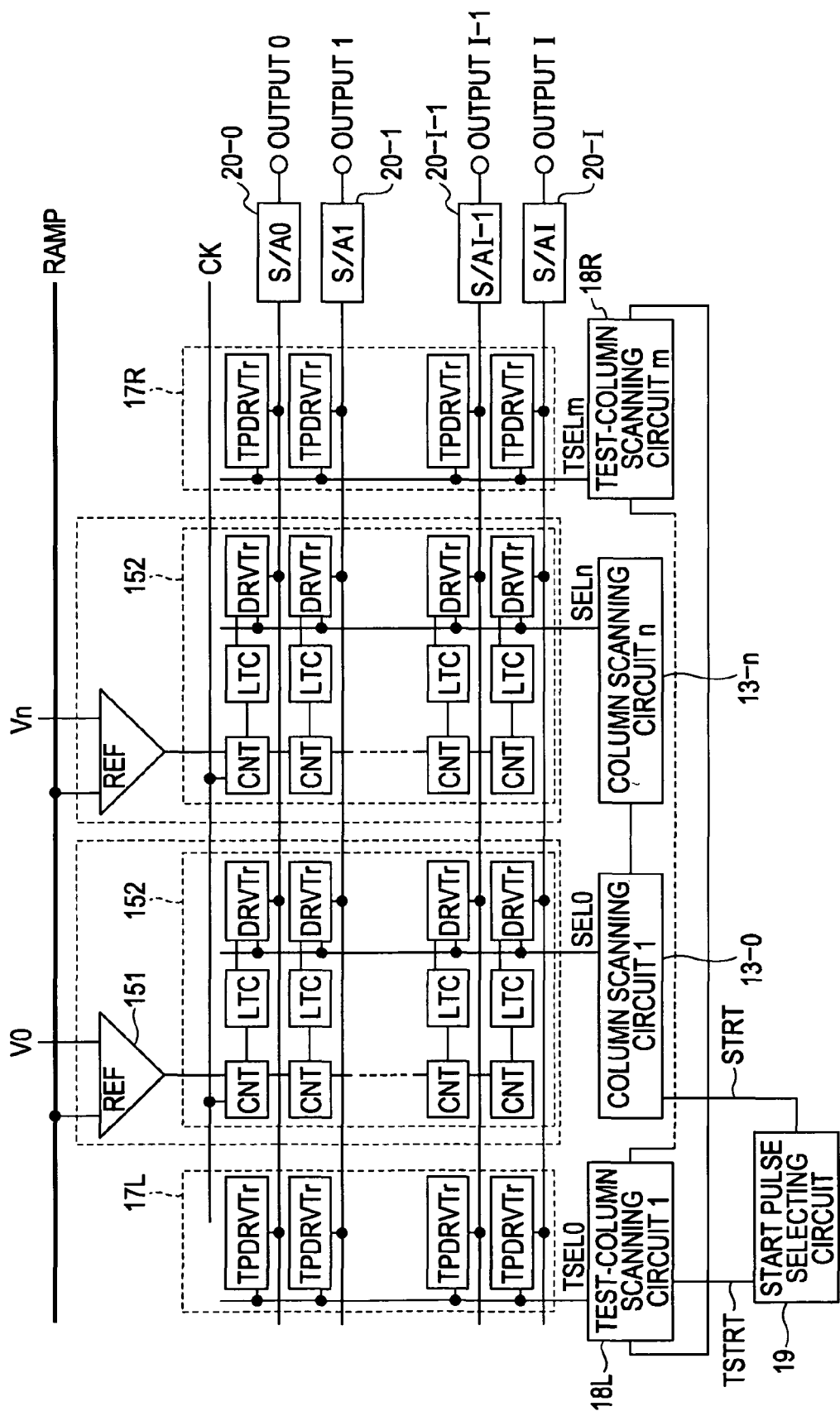
FIG. 4 is a block diagram showing more specific configurations of the ADCs shown in FIG. 3 and the solid-state-imaging-device horizontal-transfer and transfer-test systems shown in FIG. 3.

FIG. 3 is a block diagram showing an example of the configuration of a solid-state imaging device 10 (CMOS image sensor) provided with a column-parallel ADC including a data transfer circuit according to the embodiment of the present invention. FIG. 4 is a block diagram showing more specific configurations of the ADCs shown in FIG. 3 and the solid-state-imaging-device horizontal-transfer and transfer-test systems shown in FIG. 3.

The solid-state imaging device 10 includes a pixel array section 11 serving as an image pickup section, a row scanning circuit 12, a column scanning circuit 13, a timing control circuit 14, an ADC group 15, a DAC 16, test-pattern generating circuits 17L and 17R, test-column scanning circuits 18L and 18R, a start pulse selecting circuit 19, and a sense amplifier circuit (S/A) 20 serving as a data detecting circuit.

The pixel array section 11 is formed by unit pixels 111 arranged in a matrix of M rows and N columns, each unit pixel including a photodiode and an in-pixel amplifier.

In the solid-state imaging device 10, the timing control circuit 14, the row scanning circuit 12, and the column scanning circuit 13 are used as control circuits for sequentially reading signals from the pixel array section 11. The timing control circuit 14 generates internal clocks. The row scanning circuit 12 controls row addresses and row scanning. The column scanning circuit 13 controls column addresses and column scanning.

In the ADC group 15, ADCs 15A are arranged in units of column lines V0, V1, . . . so as to correspond to columns of a pixel arrangement, whereby a column-parallel ADC block 153 is formed. The ADCs 15A include (n+1) comparators 151 provided so as to correspond to columns of the pixel arrangement and asynchronous up/down counters 152 (which may be called "counter latches"). The comparators 151 compare a ramp waveform RAMP formed by changing, in steps, a reference voltage generated by the DAC 16, and analog signals obtained from the unit pixels 111 for each of row lines H0, H1, . . . via column lines V0, V1, . . . , and the asynchronous up/down counters 152 performs up/down counting in response to outputs from the comparators 151.

Outputs of the counter latches 152 are connected to a transfer line 154 having, for example, a 1+1-bit width. Outputs of the test-pattern generating circuits 17L and 17R and an input of the sense amplifier circuit 20 are connected to the transfer line 154.

Each counter latch 152 has a holding circuit function and is in a down-count state at an initial time. When the counter latch 152 performs reset counting, and an output COMPOUTi of a corresponding comparator 151 is inverted, the counter latch 152 stops a down-counting operation and holds a count value.

After that, the counter latch 152 enters an up-count state. When the counter latch 152 performs data counting on the basis of the amount of incident light, and the output COMPOUTi of the corresponding comparator 151 is inverted, the counter latch 152 holds a count value in accordance with a comparison period.

The count value held in the counter latch 152 is scanned by the column scanning circuit 13, and the scanned value is input as a digital signal to the sense amplifier circuit 20 through the transfer line 154.

A column scanning circuit 13-0 (in the column scanning circuit 13) is supplied with a start pulse STRT, whereby the column scanning circuit 13-0 is activated.

After that, adjacent column scanning circuits 13-1 to 13-n (in the column scanning circuit 13) are sequentially selected.

The test-pattern generating circuits 17L and 17R include pattern-generating circuits that generate predetermined patterns. In testing of the transfer line 154, the test-pattern generating circuits 17L and 17R sequentially supply test patterns.

The test-pattern generating circuits 17L and 17R are disposed on either side (the left and right sides in FIGS. 3 and 4) of the counter latches 152 that latch data, that is, the column-parallel ADC block 153.

In addition, the test-pattern generating circuits 17L and 17R are sequentially controlled by test-column scanning circuits 18L and 18R.

The start of the test-column scanning circuit is activated such that it is supplied with a test-start pulse TSTRT from the start pulse selecting circuit 19. After that, between the test-column scanning circuits 18L and 18R, sets of two adjacent test-column scanning circuits are sequentially selected in a reciprocating manner. At this time, supply of the start pulse STRT to the column scanning circuit 13 is stopped, and the column scanning circuit 13 is in a non-activated state.

Regarding the predetermined patterns of the test-pattern generating circuits 17L and 17R, a type of read-only memory (ROM) is used and, for example, a masked ROM is used, whereby a metal pattern change or the like can change the predetermined patterns.

Alternatively, by using an electrically erasable programmable read-only memory (EEPROM) or a register, the predetermined patterns can be externally rewritten.

Here, more specific configurations of the ADCs, and solid-state-imaging-device horizontal-transfer and transfer-test systems shown in FIG. 3 are described, with the configurations associated with FIG. 4.

Figure 5:
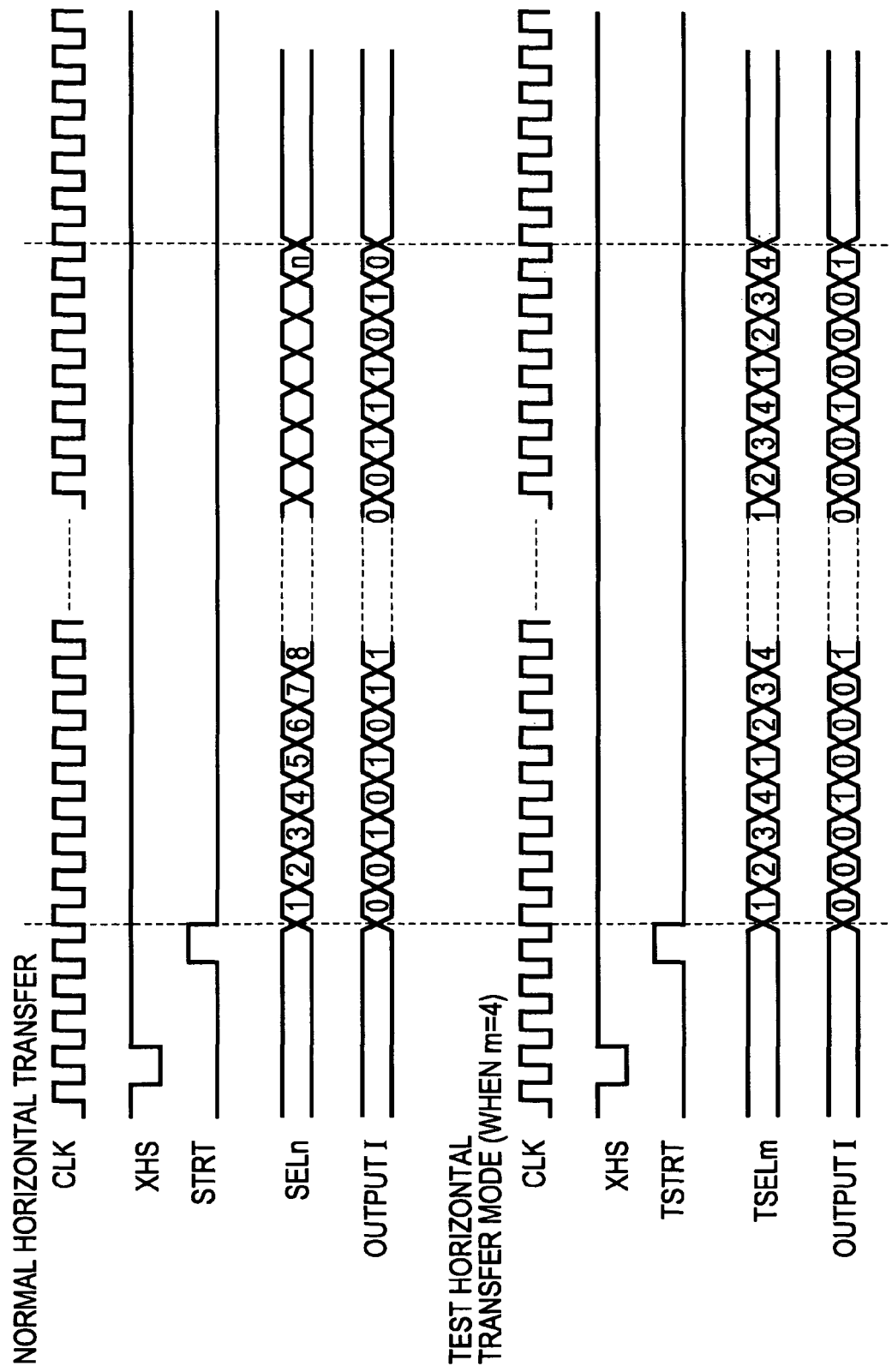
FIG. 5 is a timing chart showing normal horizontal transfer and test horizontal transfer modes of the circuit shown in FIG. 4.

In addition, FIG. 5 is a timing chart showing normal horizontal transfer and test horizontal transfer modes of the circuit shown in FIG. 4.

As shown in, for example, FIG. 4, each counter latch 152 is formed by arranging a counter (CNT), a latch (LTC), and a drive transistor (DRVTr) for one bit (such as 10 bits and 12 bits). In addition, the ADCs 15A are arranged in (n+1) columns.

In the normal horizontal transfer mode, the column scanning circuits 13-0 to 13-n sequentially select particular rows through selection lines SEL0 to SELn. At this time, the test-column scanning circuits 18L and 18R are not selected.

Among the column scanning circuits 13-0 to 13-n, a start position is selected by the start pulse selecting circuit 19. Since the column scanning circuits 13-0 to 13-n include shift registers, they are sequentially selected. Information (ones or zeroes) of drive transistors in a selected column are read and output by sense amplifier circuits 20-0 to 20-I (in the S/A 20) serving as data detecting circuits.

In the test horizontal transfer mode, the test-column scanning circuits 18L and 18R sequentially select particular test rows. At this time, the column scanning circuits 13-0 to 13-n are not selected.

Between the test-column scanning circuits 18L and 18R, a start position is selected by the start pulse selecting circuit 19. Since the test-column scanning circuits 18L to 18R include shift registers, they are sequentially selected.

In addition, since m columns of test-column scanning circuits 18R are less than n columns of column scanning circuits, circular scanning is performed. After scanning to the m-th column is performed, scanning returns to the first column.

Information (ones or zeroes) of test pattern drives TPDRVTr in the selected column are read and output by the sense amplifier circuits 20-0 to 20-I.

Figure 6:
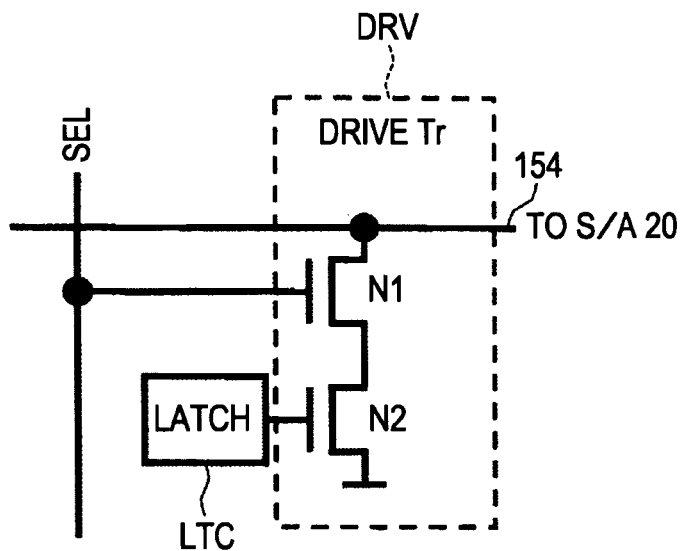
FIG. 6 is a circuit diagram showing a specific example of a test pattern drive transistor in one counter latch according to the embodiment.

FIG. 6 is a circuit diagram showing a specific example of a test pattern drive transistor in one counter latch according to the embodiment.

As shown in FIG. 6, a drive transistor DRVTr includes a select transistor N1 formed by, for example, an n-channel MOS (NMOS) transistor N1 connected in series between a predetermined potential portion and the transfer line 154, and a data transistor N2 formed by an NMOS. The gate of the select transistor N1 is connected to one selection line SEL that is driven by a corresponding column scanning circuit 13 (-0 to -n), and the gate of the data transistor N2 is connected to an output of the latch LTC.

The transistor N2 is connected to the transfer line 154 (S/A bus) by the selection line SEL driven by the corresponding column scanning circuit 13. The state of the transistor N2 is determined by latch data and is read from a corresponding sense amplifier circuit 20(-0 to -n), which is a data detecting circuit.

When the latch data is one, a current path is formed and a current flows. When the latch data is zero, the current path is blocked and no current flows.

Figure 7:
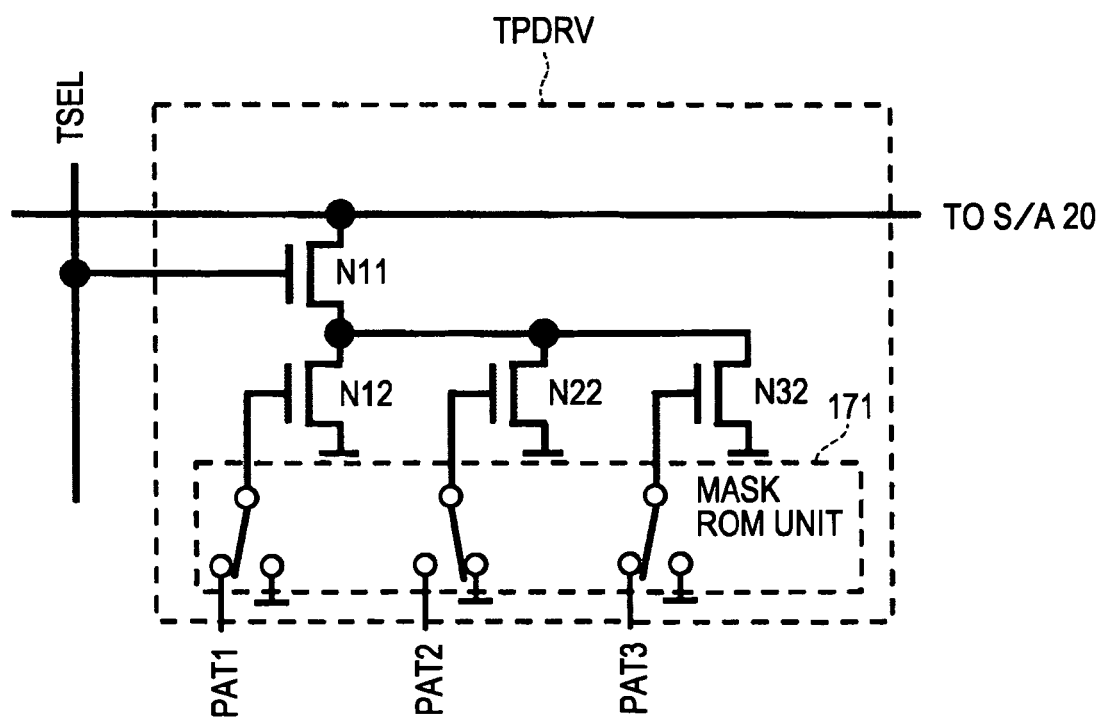
FIG. 7 is a circuit diagram showing a specific example of a case in which a test pattern drive transistor in a test-pattern generating circuit in the embodiment is formed by a mask ROM.

FIG. 7 is a circuit diagram showing a specific example of a case in which a test pattern drive transistor TSDRVTr in the test-pattern generating circuit 17L or 17R in the embodiment is formed by a mask ROM.

The test pattern drive transistor TSDRVTr includes a select transistor N11 formed by an NMOS, and data transistors N12, N22, and N32 respectively formed by NMOSs.

The drain of the select transistor N11 is connected to the transfer line 154 (S/A bus), and the source of the select transistor N11 is connected to the drains of the data transistors N12, N22, and N32. The sources of the data transistors N12, N22, and N32 are connected to the predetermined potential portion. The gate of the select transistor N11 is connected to a test selection line TSEL, and the gates of the data transistors N12, N22, and N32 are connected to corresponding data outputs of a mask ROM unit 171.

In this case, a state that establishes connection to the transfer line 154 (S/A bus) with the selection line TSEL, which is driven by outputs from the test-column scanning circuits 18L and 18R, and that is determined by a corresponding data transistor designated by a PATi signal is read from the sense amplifier circuit 20(-0 to -n).

For the data transistors, particular states (one or zero) are determined in the mask ROM unit 171. To output a plurality of patterns, a plurality of transistors that are selected by the PATi signal are provided.

For example, when it is necessary to output zero, the mask ROM unit 171 is connected to the ground.

In addition, when it is necessary to output one, the mask ROM unit 171 is connected to PATi signal lines.

Further, the PATi signals do not simultaneously indicate high states. Thus, if the data transistors have ones and zeroes, only a data transistor corresponding to a selected PATi signal becomes effective.

In addition, as described above, a data transistor state can be determined not only by the mask ROM unit 171, but also by, for example, a register or a memory such as an EEPROM.

Figure 8:
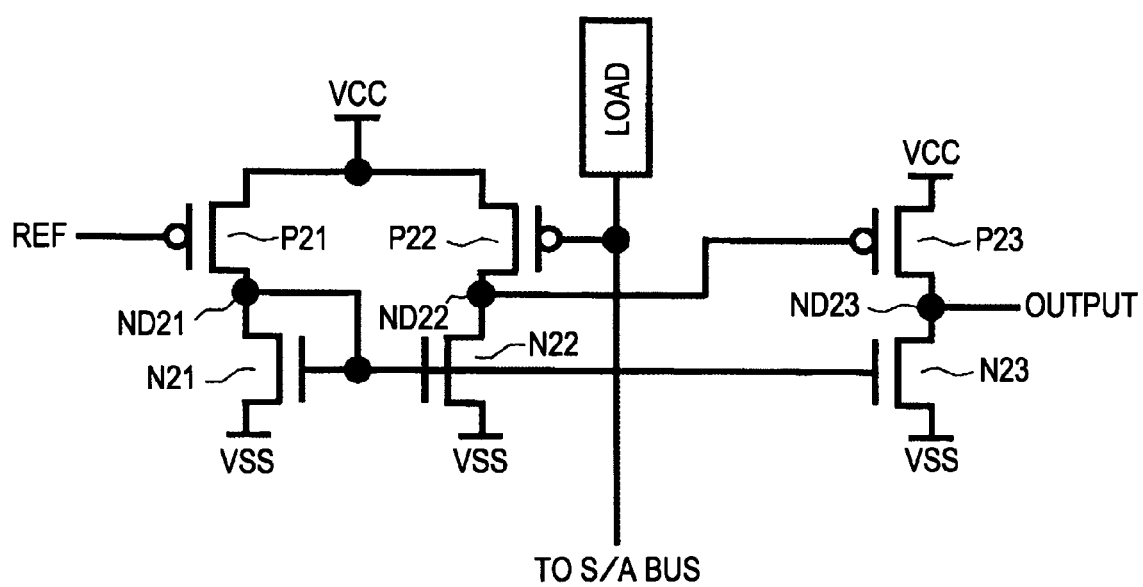
FIG. 8 is a circuit diagram showing a specific example of a sense amplifier circuit in the embodiment.

FIG. 8 is a circuit diagram showing a specific example of a sense amplifier circuit 20 in the embodiment.

The sense amplifier circuit 20 includes transistors P21 to P23 formed by p-channel MOSs (PMOSs) and transistors N21 to N23 formed by NMOSs.

The sources of the transistors P21 to P23 are connected so as to have a power-supply potential VCC, and the sources of the transistors N21 to N23 are connected so as to have a reference potential VSS.

The drain of the transistor P21 and the drain of the transistor N21 are connected to each other, and their connection node ND21 is connected to the gates of the transistors N21 and N22.

The drain of the transistor P22 and the drain of the transistor N22 are connected to each other, and the connection node ND22 is connected to the gate of the transistor P23.

The drain of the transistor P23 and the drain of the transistor N23 are connected to each other, and their junction forms an output node ND23.

In this circuit, a load serves as a constant-current source that biases the S/A bus, and the supply line is connected to the gate of the transistor P23.

In addition, a plurality of drive transistors are connected on the S/A bus, and data of one selected drive transistor drives the S/A bus to be in H or L level.

By comparing this level with a reference voltage REF, a final output is determined.

In addition, by forming a reference voltage side similarly to the S/A bus, a differential operation can be performed. In this case, the drive transistors use reverse phase driving.

Here, operations of the circuit shown in FIG. 4 in the normal transfer mode and the test transfer mode are described below, with the operations associated with FIG. 5.

In the normal horizontal transfer mode, after a certain blanking period from a synchronization signal (XHS), a start pulse signal STRT is output from the start pulse selecting circuit 19.

This signal sequentially selects the column scanning circuits 13-0 to 13-n, and SELi signals are selected in order.

Information of driver transistors in one selected column is sequentially output through the sense amplifier circuits 20-0 to 20-I as data detecting circuits (data obtained by analog-to-digital conversion is sequentially output).

Actually, the SELn signals and timing 1 of output 1 are delayed for several clocks by reading synchronization and various processes. However, both are set to be simultaneous for facilitating understanding of the order of reading.

In the test horizontal transfer mode, after a certain blanking period from a synchronization signal (XHS), a test start pulse signal TSTRT is output from the start pulse selecting circuit 19.

The test start pulse signal TSTRT sequentially selects the test-column scanning circuits 18L and 18R, and TSELi signals are selected in order.

Information of the test pattern drivers in a selected column is sequentially output through the sense amplifier circuits 20-0 to 20-n (predetermined data is sequentially output).

In addition, normally, the number of test-column scanning circuits 18L to 18R is less than the column scanning circuits 13-0 to 13-n. Thus, by performing circular scanning, the number of outputs can be set to be identical to that in a normal case.

Actually, the TSELm signals and timing of output 1 are delayed for several clocks by reading synchronization and various processes. However, both are set to be simultaneous for facilitating understanding of the order of reading.

The specific configurations and operations of the horizontal transfer system and the test system have been described.

Figure 9:
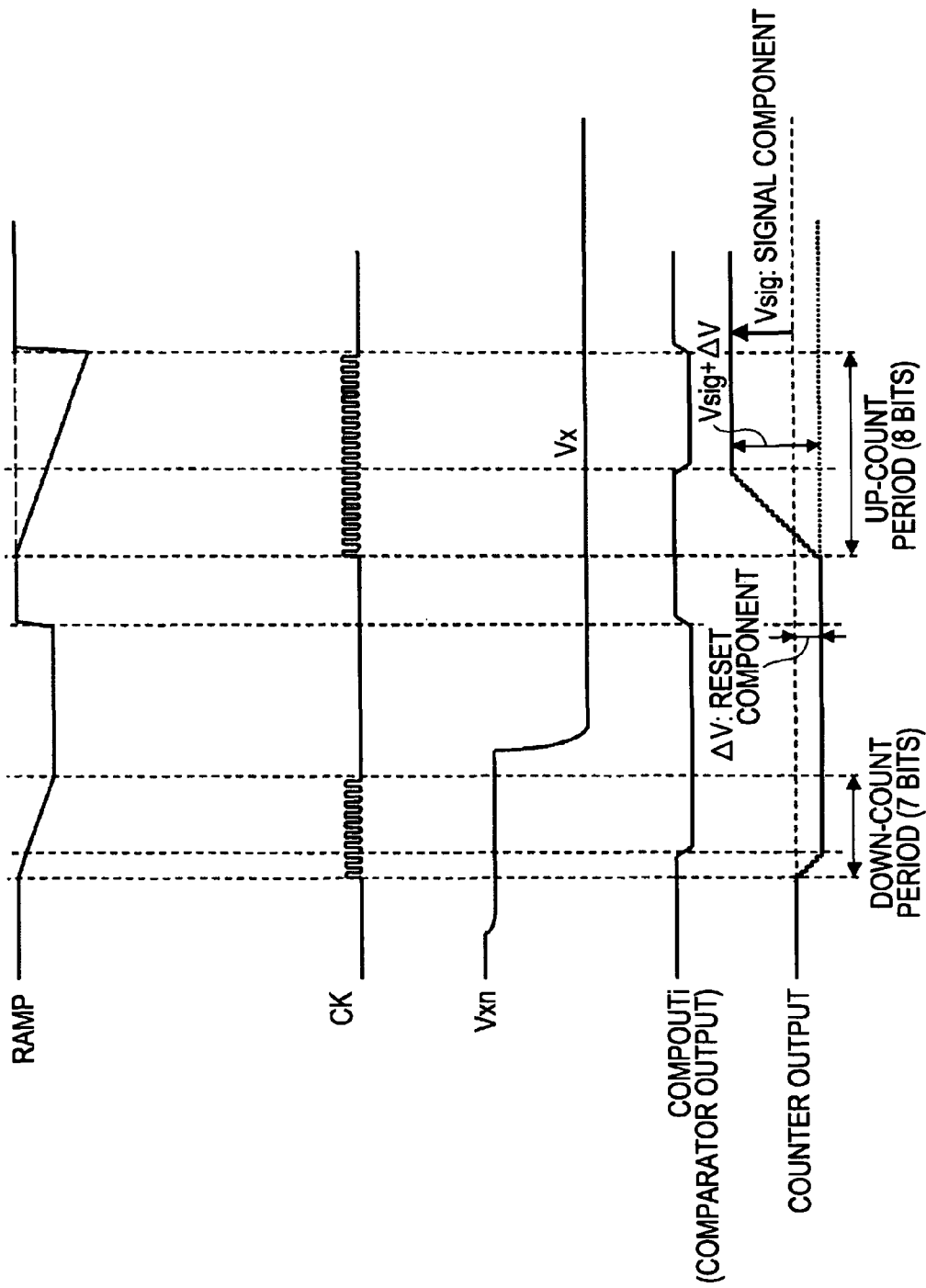
FIG. 9 is a timing chart illustrating an operation of the solid-state imaging device shown in FIG. 3.

Next, an operation of the solid-state imaging device 10 (CMOS image sensor) according to the embodiment is described below, with the operation associated with the timing chart shown in FIG. 9 and the block diagram shown in FIG. 3.

After first-time reading from unit pixels 111 in any row Hx to the column lines V0, V1, . . . becomes stable, a ramp waveform RAMP on which the reference voltage is based is output from an output of the DAC 16. The ramp waveform RAMP on which the reference voltage is based is input as a reference voltage REF for each comparator 151. The comparator 151 compares the reference voltage REF and a voltage of any column line Vx.

At this time, the counter latch 152 is in a down-count state, and performs reset counting. When the reference voltage REF is equal to the voltage of the column line Vx, an output COMPOUTi of the comparator 151 is inverted, a down-count operation is stopped and a count value is held.

At this time, it is assumed that an initial value of the counter latch 152 be any value in gray scale of analog-to-digital conversion, for example, zero. In this reset counting period, a reset component ΔV of the unit pixel 111 is read.

After that, after voltages of the column lines V0, V1, . . . on the basis of the amount of light become stable, in a data counting period, the ramp waveform RAMP is input as the reference voltage REF. Comparison of the reference voltage REF with a voltage from one of the column lines V0, V1, . . . is performed by the comparator 151.

In parallel to input of the step-like ramp waveform RAMP, each counter latch 152 performs up-counting. When the reference voltage REF is equal to the voltage of the column line Vx, the output COMPOUTi of the comparator 151 is inverted and a count value in accordance with the comparison period is held.

The count value held in the counter latch 152 is scanned by the column scanning circuit 13 and is input as a digital signal to the sense amplifier circuit 20 through the transfer line 154. A digital value is sequentially detected and output.

In addition, the start of the column scanning circuit 13 is activated such that the column scanning circuit 13 is supplied with the start pulse signal STRT from the start pulse selecting circuit 19. After that, sets of two adjacent column scanning circuits are sequentially selected.

Further, the test-pattern generating circuits 17L and 17R are connected to the transfer line 154. The test-pattern generating circuits 17L and 17R include pattern generating circuits for generating predetermined patterns, and sequentially supply test patterns in testing of a horizontal transfer line.

In addition, the test-pattern generating circuits 17L and 17R are sequentially controlled by the test-column scanning circuits 18L and 18R.

The start of each of the test-column scanning circuits 18L and 18R is activated in such a manner that it is supplied with the test start pulse signal TSTRT. After that, between the test-column scanning circuits 18L and 18R, sets of two adjacent test-column scanning circuits are sequentially selected in a reciprocating manner. At this time, the column scanning circuit 13 is in a non-activated state.

As described above, according to this embodiment, the solid-state imaging device 10 includes the pixel array section (image pickup section) 11 in which a plurality of pixels for performing photoelectric conversion are arranged in a matrix, at least one data transfer line 154 that transfers digital data, at least one sense amplifier circuit (data detecting circuit) 20 connected to the data transfer line 154, the counter latches (holding circuits) 152 that hold digital values corresponding to analog input levels read through column lines of the image pickup section and that transfer the digital values to the at least one data transfer line 154, the column scanning circuit (scanning circuit) 13 that selects a holding circuit among the plurality of holding circuits, at least one test-pattern generating circuit 17 that generates a predetermined digital value, at least one test-column scanning circuit 18 that selects the at least one test-pattern generating circuit 17, and the start-pulse selecting circuit 19 that controls starting of the scanning circuit and starting of the at least one test-column scanning circuit. The start-pulse selecting circuit 19 has a function of transferring the predetermined digital value to the at least one data transfer line 154 by activating the at least one test-pattern generating circuit 17 via the at least one test-column scanning circuit 18. Thus, the following advantages can be obtained.

In other words, by using the test-pattern generating circuits 17L and 17R, which can output predetermined values, defects in the transfer line 154 and the sense circuit can be detected.

In addition, in cases such as when it is necessary to increase the speed of horizontal transfer, confirmation testing of performance of the sense circuit can be easily, reliably performed.

Next, arranged positions of the sense amplifier circuits in the above-described solid-state imaging device are considered.

Figure 10:
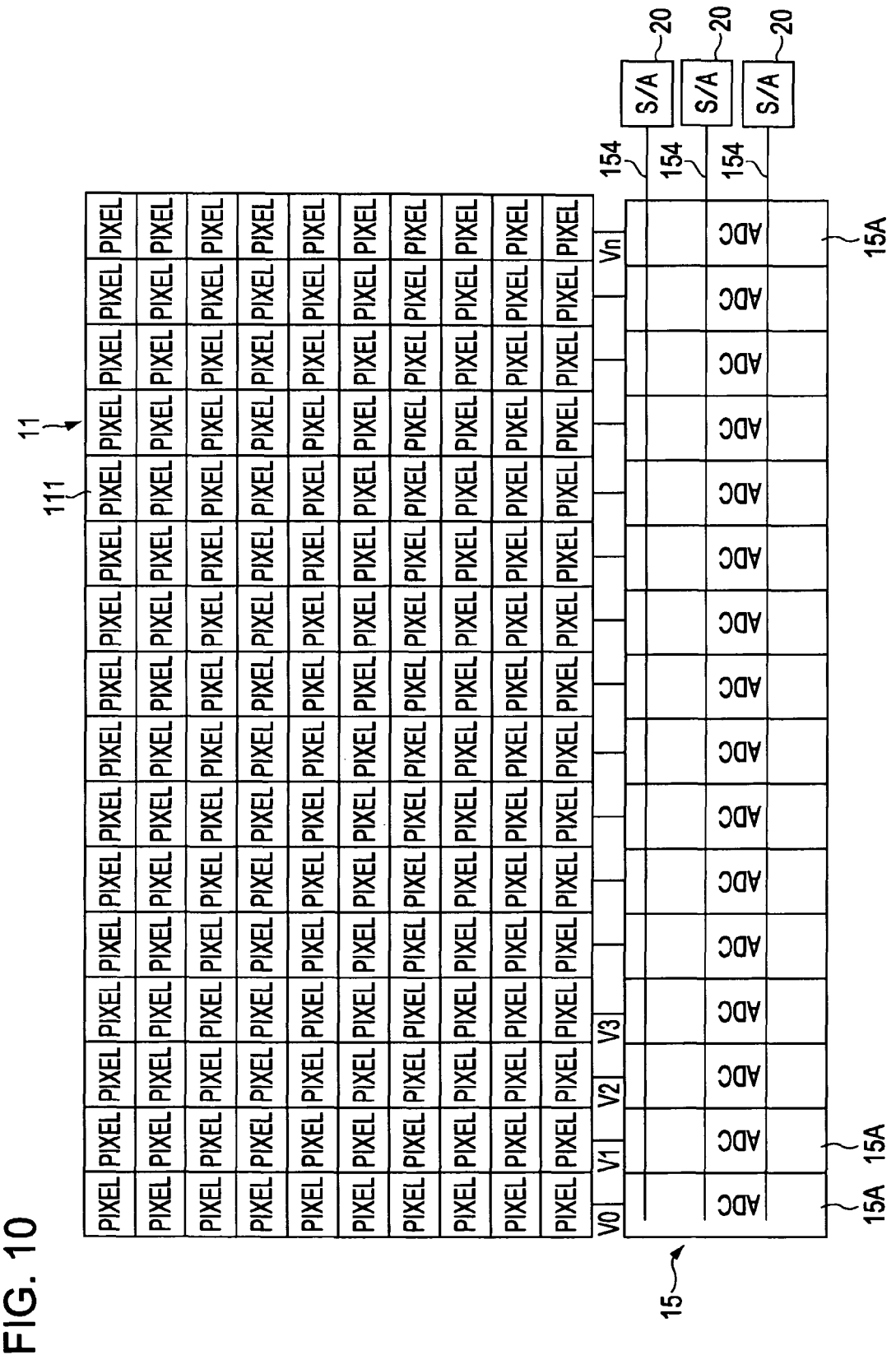
FIG. 10 is an illustration showing arrangement of pixels, ADCs, and sense amplifier circuits (S/A) for the solid-state imaging device shown in FIG. 3.

FIG. 10 is an illustration showing arrangement of pixels, ADCs, and sense amplifier circuits (S/A) for the solid-state imaging device 10 shown in FIG. 3.

Figure 11:
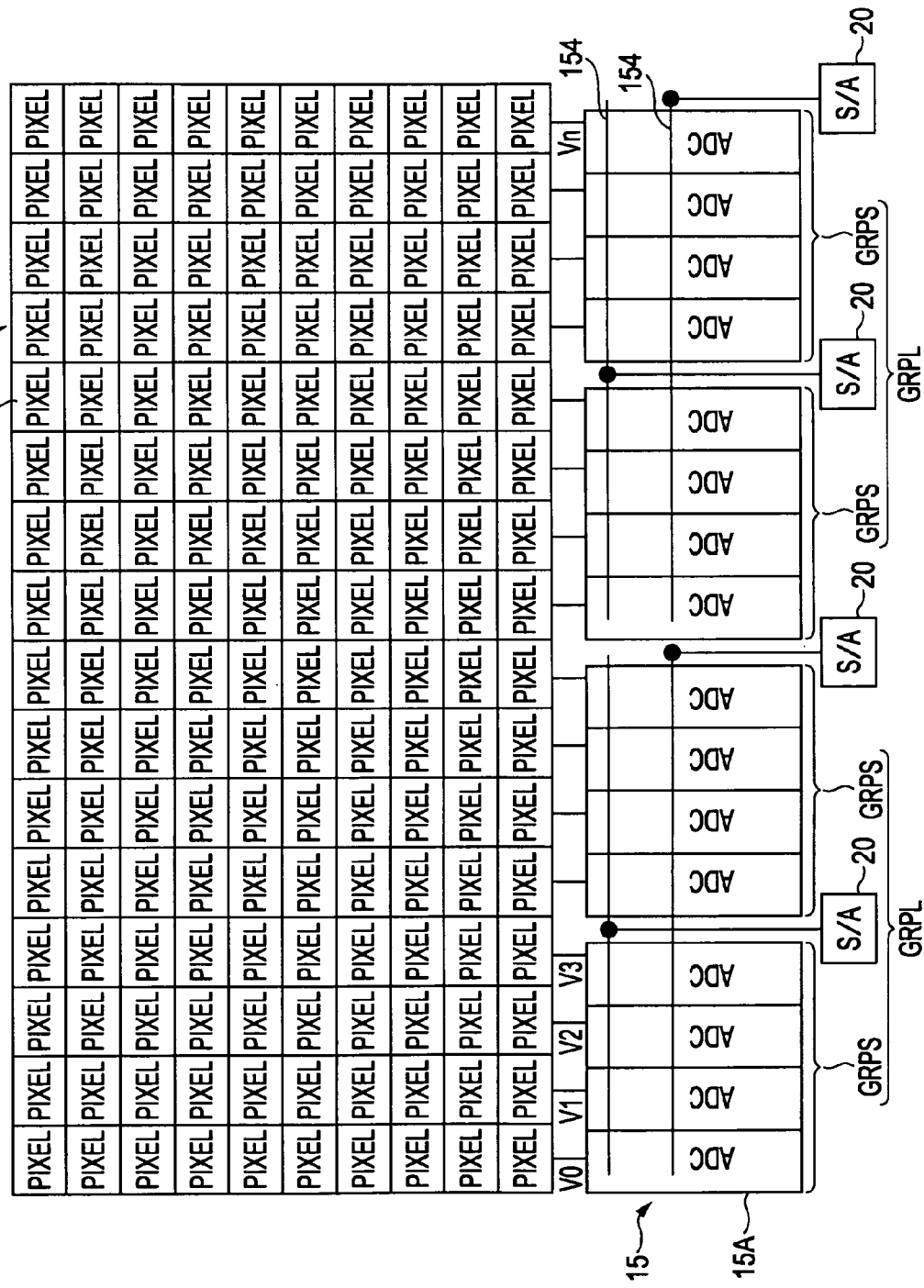
FIG. 11 is an illustration showing improved arrangement of pixels, ADCs, and sense amplifier circuits (S/A) for the solid-state imaging device shown in FIG. 3.

FIG. 11 is an illustration showing improved arrangement of pixels, ADCs, and sense amplifier circuits (S/A) for the solid-state imaging device 10 shown in FIG. 3.

In FIGS. 10 and 11, for conceptual brevity of description, test-system circuits characteristic of the embodiment are omitted.

In the case of a CMOS sensor, it is necessary to arrange pixels in an array. In the case of a memory, there is no restriction in physical position. Thus, the memory can be properly divided.

Regarding a pixel pitch, the pixels are arranged at a very fine pitch of 2 approximately μm to 3 μm, depending on a unit pixel size.

Accordingly, the ADCs 15A in the ADC group 15 need to be arranged in accordance with the pitch.

In particular, regarding the comparators 151 that are analog circuits, to prevent differences in characteristic, uniformity of layout of the comparators 151 is important. Thus, by forming layout in accordance with the pixel pitch, it is necessary to suppress a variation in characteristic.

As a result, as shown in FIG. 10, the transfer line 154 (horizontal transfer bus) connecting to the sense amplifier circuit 20 is disposed so as to traverse the ADCs 15A.

The horizontal transfer bus at this time has, for example, a length of approximately 7 mm, and can have a very large parasitic resistance and parasitic capacitance.

This may cause a delay in reading time.

Accordingly, as shown in FIG. 11, by employing a layout in which, in the gap portion, the horizontal transfer bus is disposed in a vertical direction, that is, a wiring direction of the column line Vx, the horizontal transfer bus can be divided, whereby parasitic resistance and parasitic capacitance can be reduced. In other words, by forming a hierarchical sense-amplifier-bus arrangement, parasitic resistance and parasitic capacitance can be reduced.

As a result, the reading time can be reduced.

In addition, parallel processing can be performed, thus enabling further acceleration.

In this case, the ADCs 15A are grouped into small groups GRPS, and the small groups GRPS are grouped into large groups GRPL. For each of the small groups GRPS and the large groups GRPL, the sense amplifier circuit 20 is disposed.

In this case, it is preferable that the ADC pitch be adapted for the pixel pitch in a range reaching the comparators 151 that are analog circuits, and it is preferable that the ADC pitch be reduced from the counter latches, which are digital devices.

In addition, since the horizontal transfer bus is divided, partial reading (activation) can be also performed. In other words, so-called "window segmenting" is possible.

Figure 12:
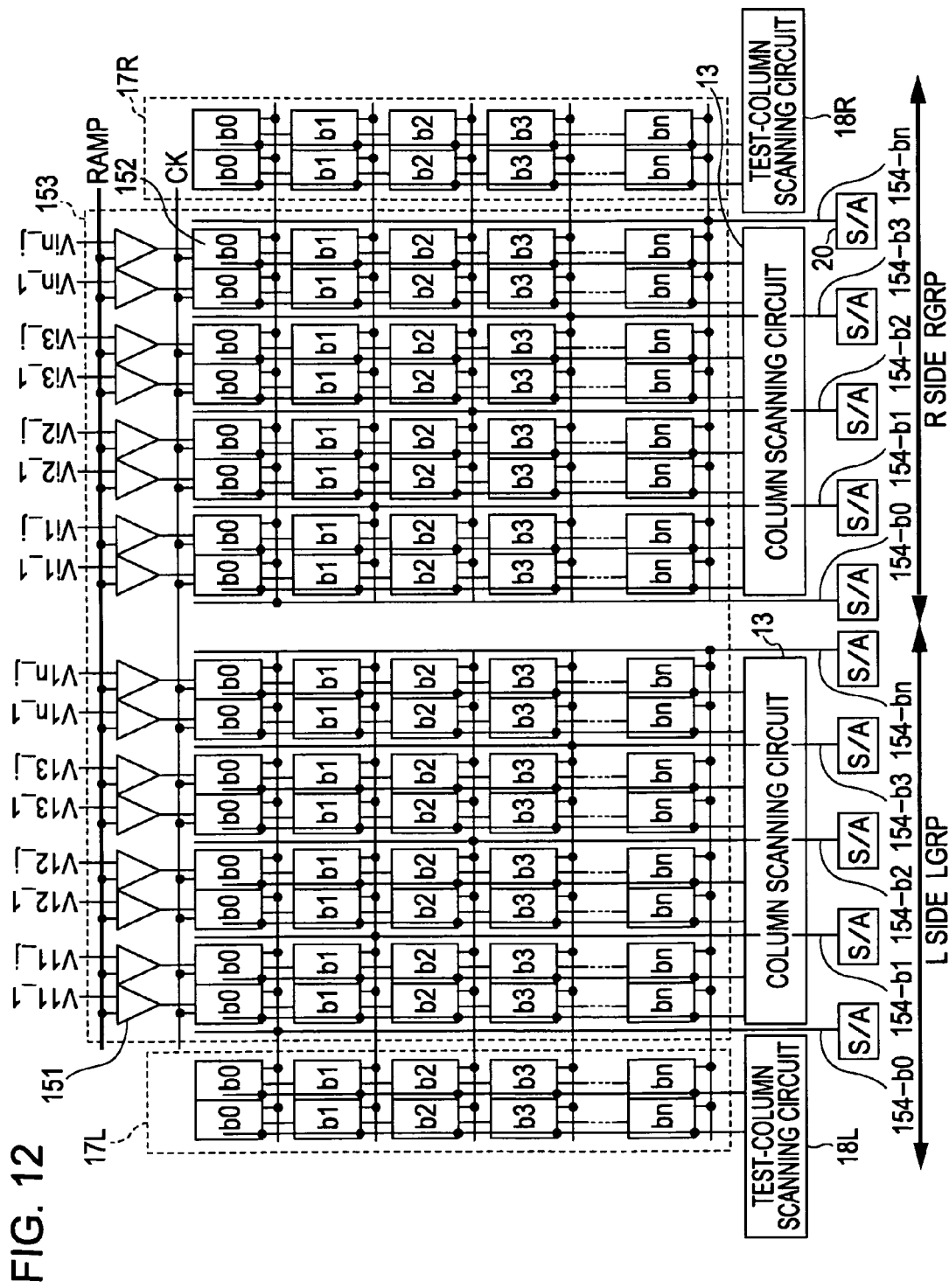
FIG. 12 is an illustration showing a first example of the configuration of a horizontal transfer system in which the construction concept shown in FIG. 11 is employed for the solid-state imaging device, according to the embodiment, including a test-system circuit.
Figure 13:
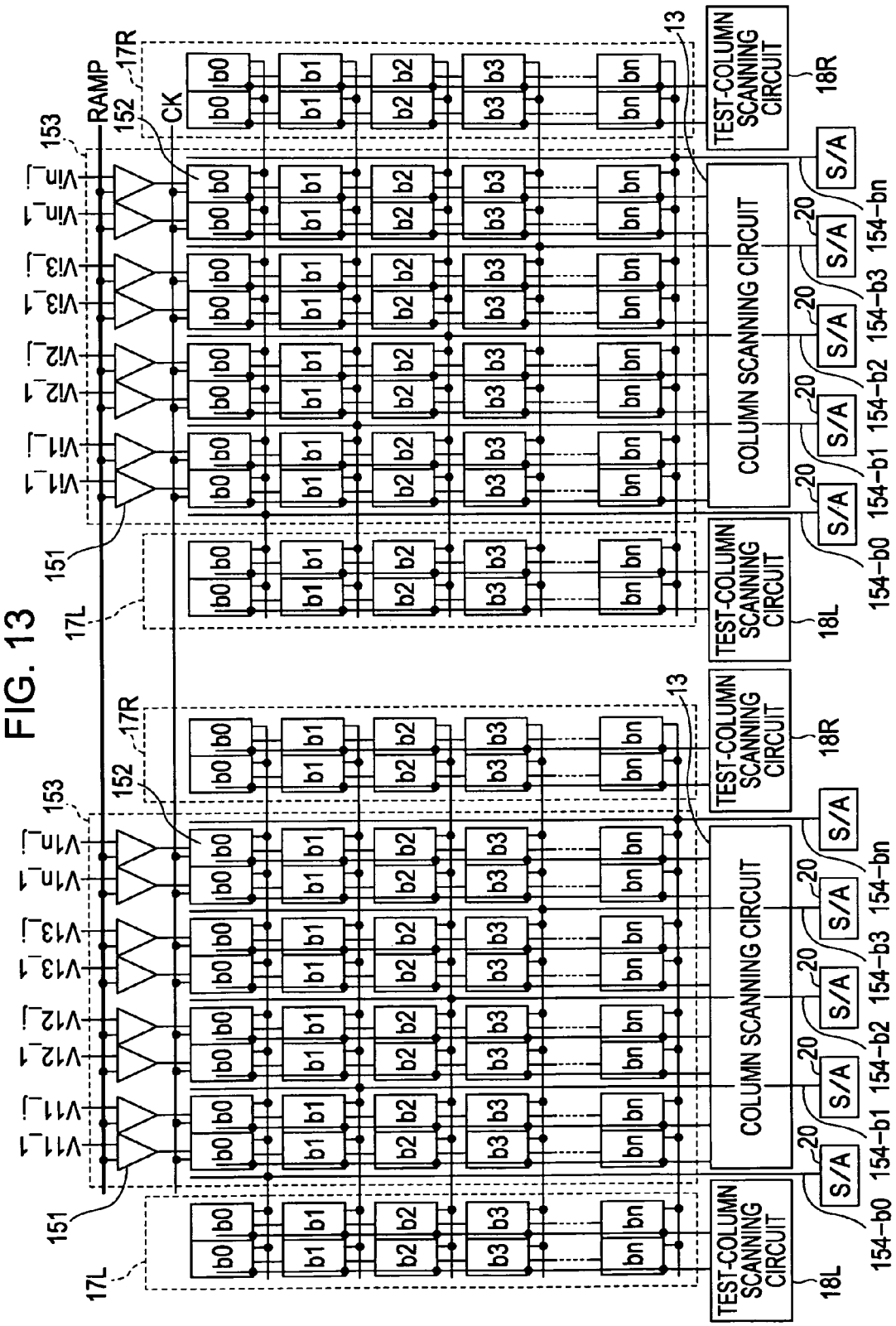
FIG. 13 is an illustration showing a second example of the configuration of a horizontal transfer system in which the construction concept shown in FIG. 11 is employed for the solid-state imaging device, according to the embodiment, including a test-system circuit.

FIGS. 12 and 13 are illustrations showing an example configuration of a horizontal transfer system in which the construction concept shown in FIG. 11 is employed for the solid-state imaging device, according to the embodiment, including a test-system circuit.

In the example shown in FIG. 12, two groups of ADCs 15A are formed. For the two groups, that is, a left group LGRP and a right group RGPR, a hierarchical sense-amplifier-bus arrangement is formed in units of bits. In addition, the test-pattern generating circuits 17L and 17R, and the test-column scanning circuits 18L and 18R are disposed, with the two groups LGRP and RGPR provided therebetween.

In this case, for the left group LGRP, the test-pattern generating circuit 17L and the test-column scanning circuit 18 on the left side are used. For the right group RGRP, the right test-pattern generating circuit 17R and the test-column scanning circuit 18 on the right side are used.

In the example shown in FIG. 13, a plurality of groups of ADCs 15A are formed. For each group, a hierarchical sense-amplifier-bus arrangement is formed in units of bits. In addition, the test-pattern generating circuit 17L and the test-column scanning circuit 18L are disposed on one side of each group, and the test-pattern generating circuit 17R and the test-column scanning circuit 18R are disposed on another side of the group. The group is provided between a set of the test-pattern generating circuit 17L and the test-column scanning circuit 18L and a set of the test-pattern generating circuit 17R and the test-column scanning circuit 18R.

In this case, for each group, the test-pattern generating circuits 17L and 17R, and the test-column scanning circuits 18L and 18R, on both sides, are used.

As described above, by disposing the test-pattern generating circuits 17L and 17R, and the test-column scanning circuits 18L and 18R in the column-parallel ADC block 153 in the ADC group 15, influence on dependency of the arranged positions can be evaluated.

The solid-state imaging device having the above advantages can be applied as an image pickup device for digital cameras and video cameras.

Figure 14:
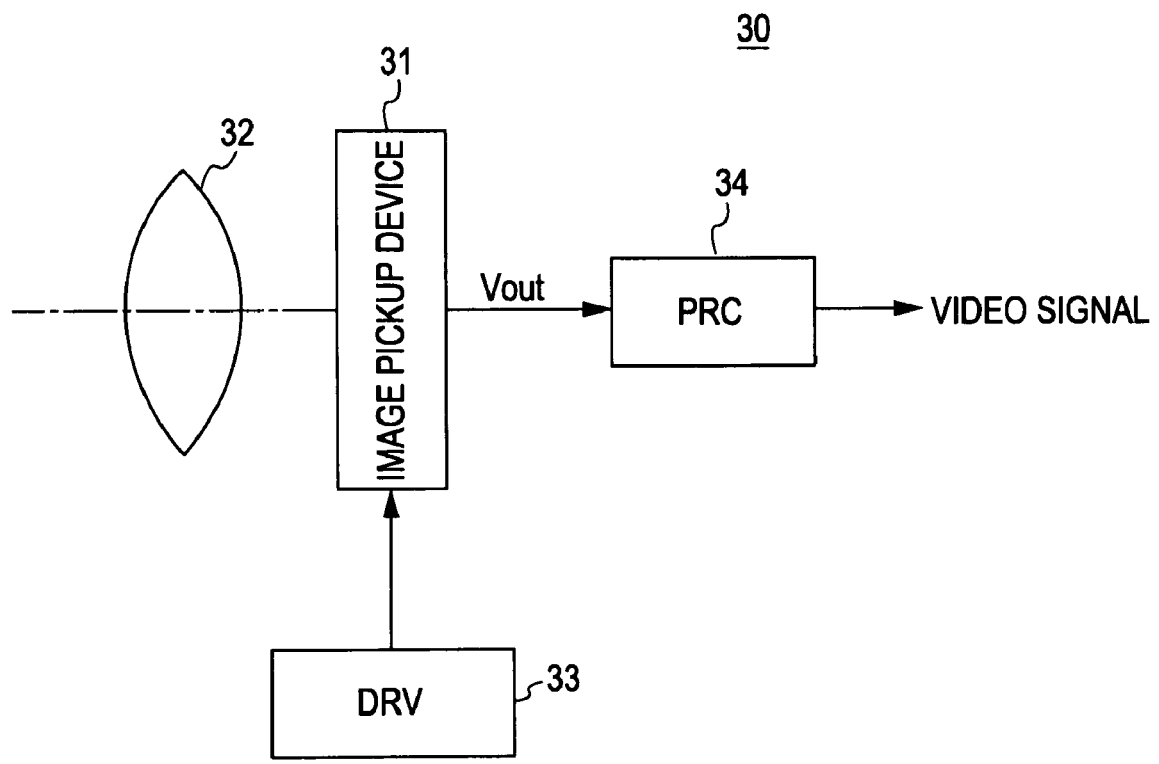
FIG. 14 is a block diagram showing an example of the configuration of a camera system to which the solid-state imaging device according to the embodiment of the present invention is applied.

FIG. 14 is a block diagram showing an example of the configuration of a camera system 30 to which the solid-state imaging device according to the embodiment of the present invention is applied.

As shown in FIG. 14, the camera system 30 includes an image pickup device 31 to which the solid-state imaging device 10 according to the embodiment is applicable, an optical system for guiding incident light to a pixel region of the image pickup device 31 (focusing a subject image), for example, a lens 32 for focusing incident light (image light) on an image pickup plane, a driving circuit (DRV) 33 for driving the image pickup device 31, and a signal processing circuit (PRC) 34 for processing an output signal from the image pickup device 31.

The driving circuit 33 includes a timing generator (not shown) for generating various types of timing signals including a start pulse and clock pulses that drive circuits in the image pickup device 31. The driving circuit 33 drives the image pickup device 31 with predetermined timing.

In addition, the signal processing circuit 34 performs signal processing, such as correlated double sampling (CDS), on the output signal from the image pickup device 31.

An image signal generated by the signal processing circuit 34 is recorded on a recording medium such as a memory. Image information represented by the image signal recorded on the recording medium is output as a hard copy by a printer or the like. In addition, the image signal generated by the signal processing circuit 34 is displayed as a moving picture on a monitor such as a liquid crystal display.

As described above, by using the above solid-state imaging device 10 as the image pickup device 31 in an image pickup apparatus such as a digital still camera, a high-precision camera is realized.

It should be understood by those skilled in the art that various modifications, combinations, sub-combinations and alterations may occur depending on design requirements and other factors insofar as they are within the scope of the appended claims or the equivalents thereof.

What is claimed is:

1. A data transfer circuit comprising:
   at least one data transfer line that transfers digital data;
   at least one data detecting circuit connected to the at least one data transfer line;
   a plurality of holding circuits that hold digital values corresponding to input levels and that transfer the digital values to the at least one data transfer line;
   a scanning circuit that selects a holding circuit from among the plurality of holding circuits;
   at least one test-pattern generating circuit that generates a predetermined digital value, the at least one test-pattern generating circuit being connected to the at least one data transfer line;
   at least one test-column scanning circuit that selects the at least one test-pattern generating circuit; and
   a start-pulse selecting circuit that controls starting of the scanning circuit and starting of the at least one test-column scanning circuit,
   wherein the start-pulse selecting circuit has a function of transferring the predetermined digital value to the at least one data transfer line by activating the at least one test-pattern generating circuit, and wherein the predetermined digital value is transferred across portions of the data transfer line that are adjacent the plurality of holding circuits.

2. The data transfer circuit according to claim 1,
wherein the at least one test-pattern generating circuit is disposed at at least one end of a region in which the plurality of holding circuits are arranged.

3. The data transfer circuit according to claim 1,
wherein the at least one test-pattern circuit includes a plurality of test-pattern generating circuits, and
wherein the plurality of test-pattern generating circuits are disposed at two ends of a region in which the plurality of holding circuits are arranged.

4. The data transfer circuit according to claim 2,
wherein the plurality of holding circuits are arranged in parallel, and
wherein the at least one data transfer line is provided in a direction in which the plurality of holding circuits are arranged in parallel and is connected to the at least one data detecting circuit, which is disposed in the direction.

5. The data transfer circuit according to claim 2,
wherein the plurality of holding circuits are disposed in parallel, and
wherein the at least one data transfer line is provided in a perpendicular direction with respect to a direction in which the plurality of holding circuits are arranged in parallel and is connected to the at least one data detecting circuit, which is disposed in the perpendicular direction.

6. The data transfer circuit according to claim 5,
wherein the at least one test-pattern generating circuit includes a test-pattern generating circuit, which is disposed in the region in which the plurality of holding circuits are arranged.

7. The data transfer circuit according to claim 6,
wherein the at least one test-pattern generating circuit includes a data holding unit capable of outputting a plurality of test patterns.

8. A solid-state imaging device comprising:
an image pickup section in which a plurality of pixels for performing photoelectric conversion are arranged in a matrix;
at least one data transfer line that transfers digital data;
at least one data detecting circuit connected to the, at least one data transfer line;
a plurality of holding circuits that hold digital values corresponding to analog input levels read through column lines of the image pickup section and that transfer the digital values to the at least one data transfer line;
a scanning circuit that selects a holding circuit among the plurality of holding circuits;
at least one test-pattern generating circuit that generates a predetermined digital value, the at least one test-pattern generating circuit being connected to the at least one data transfer line;
at least one test-column scanning circuit that selects the at least one test-pattern generating circuit; and
a start-pulse selecting circuit that controls starting of the scanning circuit and starting of the at least one test-column scanning circuit,
wherein the start-pulse selecting circuit has a function of transferring the predetermined digital value to the at least one data transfer line by activating the at least one test-pattern generating circuit, and wherein the predetermined digital value is transferred across portions of the data transfer line that are adjacent the plurality of holding circuits.

9. The solid-state imaging device according to claim 8,
wherein the at least one test-pattern generating circuit is disposed at at least one end of a region in which the plurality of holding circuits are arranged.

10. The solid-state imaging device according to claim 8,
wherein the at least one test-pattern circuit includes a plurality of test-pattern generating circuits, and
wherein the plurality of test-pattern generating circuits are disposed at two ends of a region in which the plurality of holding circuits are arranged.

11. The solid-state imaging device according to claim 9,
wherein the plurality of holding circuits are arranged in parallel, and
wherein the at least one data transfer line is provided in a direction in which the plurality of holding circuits are arranged in parallel and is connected to the at least one data detecting circuit, which is disposed in the direction.

12. The solid-state imaging device according to claim 10,
wherein the plurality of holding circuits are disposed in parallel, and
wherein the at least one data transfer line is provided in a perpendicular direction with respect to a direction in which the plurality of holding circuits are arranged in parallel, and is connected to the at least one data detecting circuit, which is disposed in the perpendicular direction.

13. The solid-state imaging device according to claim 12,
wherein the test-pattern generating circuits include the at least one test-pattern generating circuit, which is disposed in the region in which the plurality of holding circuits are arranged.

14. A camera system comprising:
a solid-state imaging device;
an optical system that focuses a subject image on the solid-state imaging device; and
a signal processing circuit that processes an image signal output from the solid-state imaging device,
wherein the solid-state imaging device includes
an image pickup section in which a plurality of pixels for performing photoelectric conversion are arranged in a matrix;
at least one data transfer line that transfers digital data;
at least one data detecting circuit connected to the at least one data transfer line;
a plurality of holding circuits that hold digital values corresponding to analog input levels read through column lines of the image pickup section and that transfer the digital values to the at least one data transfer line;
a scanning circuit that selects a holding circuit among the plurality of holding circuits;
at least one test-pattern generating circuit that generates a predetermined digital value, the at least one test-pattern generating circuit being connected to the at least one data transfer line;
at least one test-column scanning circuit that selects the at least one test-pattern generating circuit; and
a start-pulse selecting circuit that controls starting of the scanning circuit and starting of the at least one test-column scanning circuit,
wherein the start-pulse selecting circuit has a function of transferring the predetermined digital value to the at least one data transfer line by activating the at least one test-pattern generating circuit wherein the predetermined digital value is transferred across portions of the data transfer line that are adjacent the plurality of holding circuits.

* * * * *